Sept. 19, 1967 R. E. MAINE 3,343,170
LORAN TRACKING AND DISPLAY MEANS
Filed Oct. 22, 1965 4 Sheets-Sheet 2

INVENTOR
REUBEN E. MAINE
BY Watson, Cole, Grindle & Watson
ATTORNEYS

INVENTOR
REUBEN E. MAINE

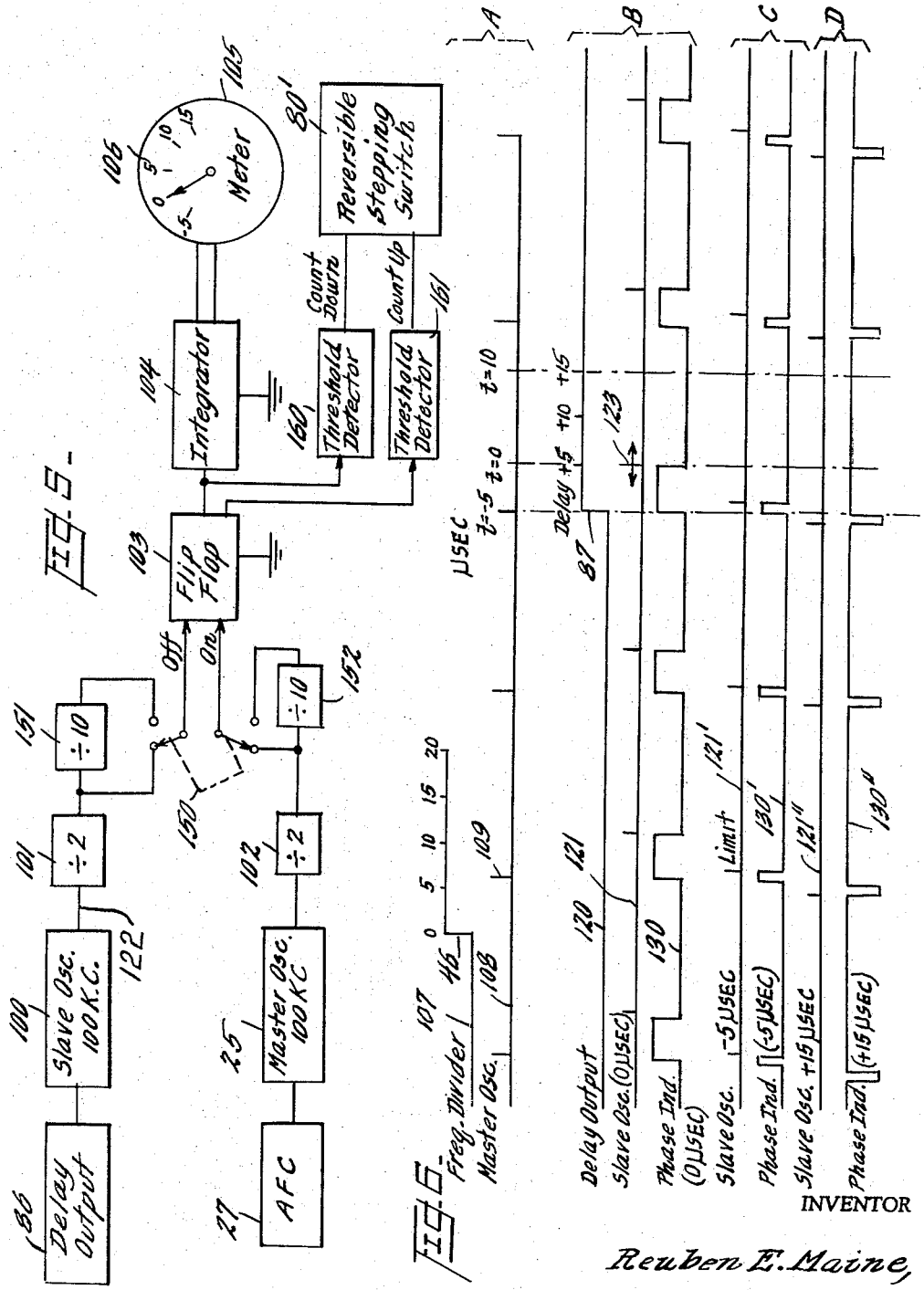

United States Patent Office 3,343,170
Patented Sept. 19, 1967

3,343,170
LORAN TRACKING AND DISPLAY MEANS
Reuben E. Maine, Charlottesville, Va., assignor to Electronic Concepts, Inc., Charlottesville, Va., a corporation of Virginia
Filed Oct. 22, 1965, Ser. No. 501,780
5 Claims. (Cl. 343—103)

ABSTRACT OF THE DISCLOSURE

This loran system provides for simplified metering of at least part of the range readings by a meter indicator not requiring a time base. This principle is extended to provide a simplified automatic range control that steps automatically as range variations take place.

This invention relates to loran systems and, more particularly, it relates to tracking and display circuits in loran receivers.

In loran receivers it is necessary to provide accurate metering of pulses received from two different transmission stations in order to closely approximate the position of the receiver. Such measurements are conventionally made by visual comparison of displaced pulses on two sweeps of an oscilloscope screen. However, greater accuracy may be provided by employing vernier readings from electronic phase discrimination circuits which electronically process signals to provide accuracies greater than obtainable by visual judgment of the relationship of pulses on an oscilloscope screen. Such a system is disclosed in my copending application, Serial No. 482,744, filed August 26, 1965, for Loran Control and Timing Circuits.

Furthermore, it is desirable to provide simplified loran receiver systems having capabilities for automatic tracking so that an operator in a moving boat or aircraft is freed from continuous adjustment for other duties after the loran receiver is adjusted initially to receive the proper transmitted signals within the desired operating range.

Thus, it is an objective of the present invention to provide electronic display devices of high accuracy for indicating the distance between two displaced loran pulses.

A further objective of the invention is to provide simplified loran receiving equipment for automatic signal tracking.

A general object of the invention is to provide a simplified high accuracy loran receiver system.

Basically, a loran receiver in operation serves to generate accurate repetitive processing periods of variable length known as pulse repetition rates, which correspond to the several standard transmissions available. It should have simplified control systems which provide selectivity over a range permitting operation with any of the standard loran transmissions which might be encountered in either of the two systems known as Loran A and Loran C. In this respect the receiver has multi-frequency operational capabilities in the following bands:

| | Kilocycles |
|---|---|
| Channel 1 | 1950 |
| Channel 2 | 1850 |
| Channel 3 | 1900 |
| Loran C | 100 |

In order to match the transmitted pulse repetition rates, the loran receiver should also be able to reproduce internal operation which conforms to the following standards or Basic Pulse Repetition Rates (BPRR):

| Designation | Frequency (cycles per second) | Timing Period (microseconds) | |
|---|---|---|---|
| | | Loran A | Loran C |
| SS | 10 | | 100,000 |
| SL | 12½ | | 80,000 |
| SH | 16⅔ | | 60,000 |
| S | 20 | 25,000 | 50,000 |
| L | 25 | 20,000 | 40,000 |
| H | 33⅓ | 15,000 | 30,000 |

Furthermore, provision must be made to alter the Basic Pulse Repetition Rates by amounts designated as Specific Pulse Repetition Rates (SPRR). In this respect the operation is typified for the basic rate H and the other periods are similarly modified by designation of specific rates. Note that Loran C is just double the timing period for Loran A in the basic rates S, L, and H. The exact pulse repetition rates therefore are correlated as follows:

| SPRR: | Period (microseconds) |
|---|---|
| 0 | 30,000 |
| 1 | 29,900 |
| 2 | 29,800 |
| 3 | 29,700 |
| 4 | 29,600 |
| 5 | 29,500 |
| 6 | 29,400 |
| 7 | 29,300 |

Several basic functions must be performed within the loran receiver to provide accurate positional information by reference to information printed in terms of time difference hyperbolae on standard loran hydrographic charts. Thus, the difference in time between pulses received from two different transmission stations must be accurately measured to enable the operator to locate the hyperbola on the chart having the same time difference. By using two different loran transmission signal pairs a fix can be taken to identify position of the receiver. Thus, it is necessary to provide the ability to receive and process signals to accurately determine time differences between pulse pairs which may occur in different ones of the available standard transmissions. Also, it is clear that any inaccuracies produced in processing the signals or measuring the time differences result in position errors.

Accordingly, the provision for an accurate time difference measure is a basic functional requirement of the loran receiver system.

One aspect of the invention thus is the provision of a simple and accurate automatic indicator meter for signifying the magnitude of the time difference between two loran pulses in any desired range but specifically able to extend the accuracy beyond the least significant digit that may be maintained in range by manual selection of timing controls. This is accomplished in such a manner that the accuracy of the reading may be extended to whatever extent is deemed necessary and is not inherently limited by signal processing delays encountered, etc. This indication is produced by a simplified system concept which also removes dependency of the accuracy upon waveform delays encountered in signal processing circuits and precludes special system configurations which require extensive additional equipment for producing automatic tracking of signals within desired ranges exhibited upon a visual meter display.

A further aspect of the invention provides for automatic ranging control beyond the range of the visual indicator meter to produce automatic tracking over a large range, while maintaining reading accuracy at high precision within a small meter range.

Various aspects of the invention including its organization and further features and advantages are incorporated in the following more detailed description which refers to the accompanying drawings, wherein:

FIGURE 5 is a block circuit diagram embodying the automatic tracking and visual indicator feature afforded by the invention; and FIGURE 6 is a waveform diagram used to illustrate the operation of the circuits shown in FIGURE 5.

Figure 1:
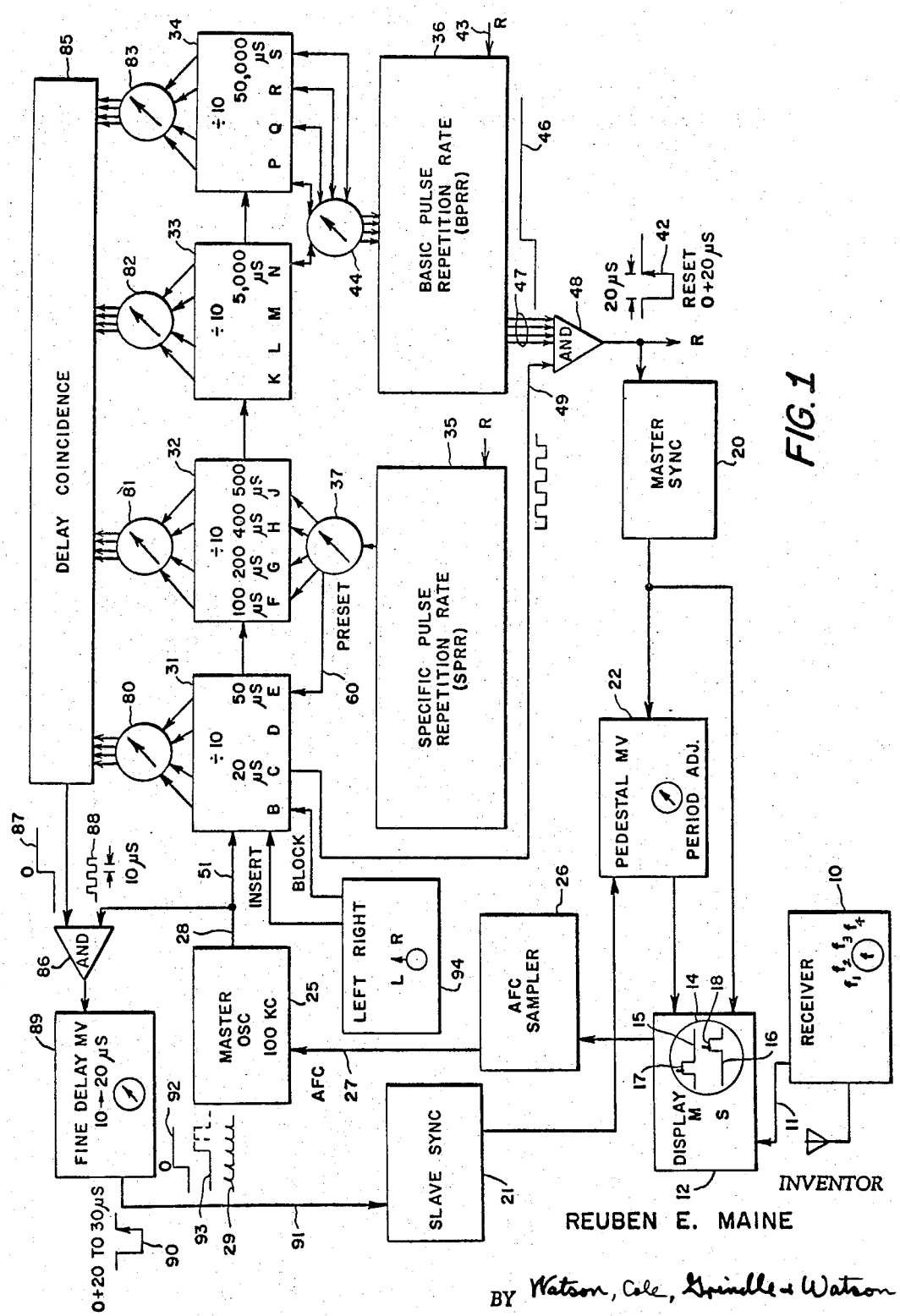
FIGURE 1 is a block system diagram of a loran receiver system afforded by the invention.

With reference to the system diagram of FIGURE 1, the various circuit configurations which are conventional and within the realm of those skilled in the loran art are shown only in block form. For example, the receiver 10 is of conventional design, supplying received loran pulses on lead 11 to display means 12. The display means 12 is a conventional oscilloscope type monitor having screen 14 which provides a time reference on a pair of timed and synchronized traces or sweeps 15, 16 respectively displaying received loran pulses 17, 18 from two different stations on pedestals which are derived respectively from master (M) timing control circuits 20 and slave (S) timing control circuits 21 by way of a pedestal multivibrator circuit 22.

Also the master oscillator 25 is conventionally controlled for synchronous operation with loran pulses received on receiver 11, by way of sampling circuit 26 and automatic frequency control (AFC) lead 27. The oscillator is a stable crystal controlled oscillator adapted for synchronous operation and may have any desired frequency which is a multiple of 100 kilocycles, but for purposes of this system provides a basic output signal at lead 28 at a frequency of 100 kilocycles, which may be in the form of pulses 29, for example. The remainder of the system shown in FIGURE 1 having reference characters greater than 30 is more particularly related to the provisions of the present invention, and thus will be described in greater detail.

Figure 2:
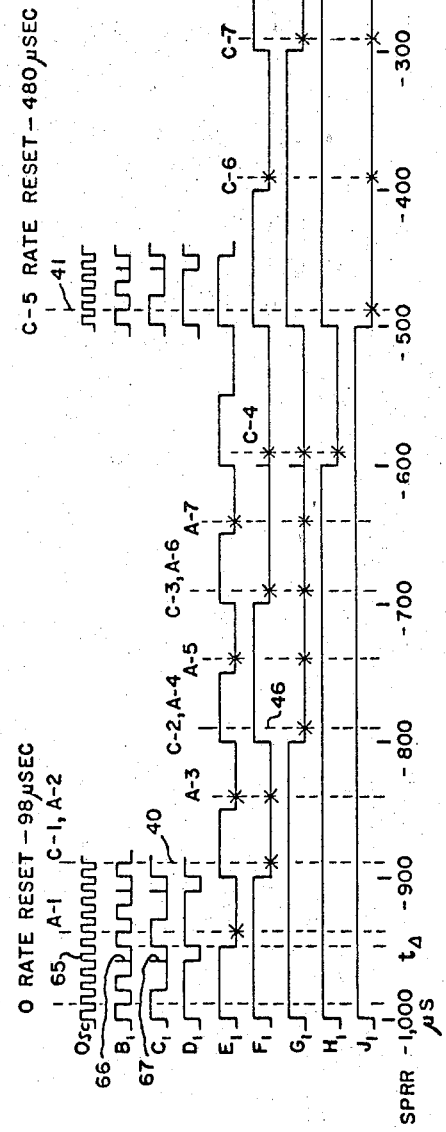
FIGURES 2 and 3 are waveform charts relating the various control functions to the corresponding circuits.
Figure 3:
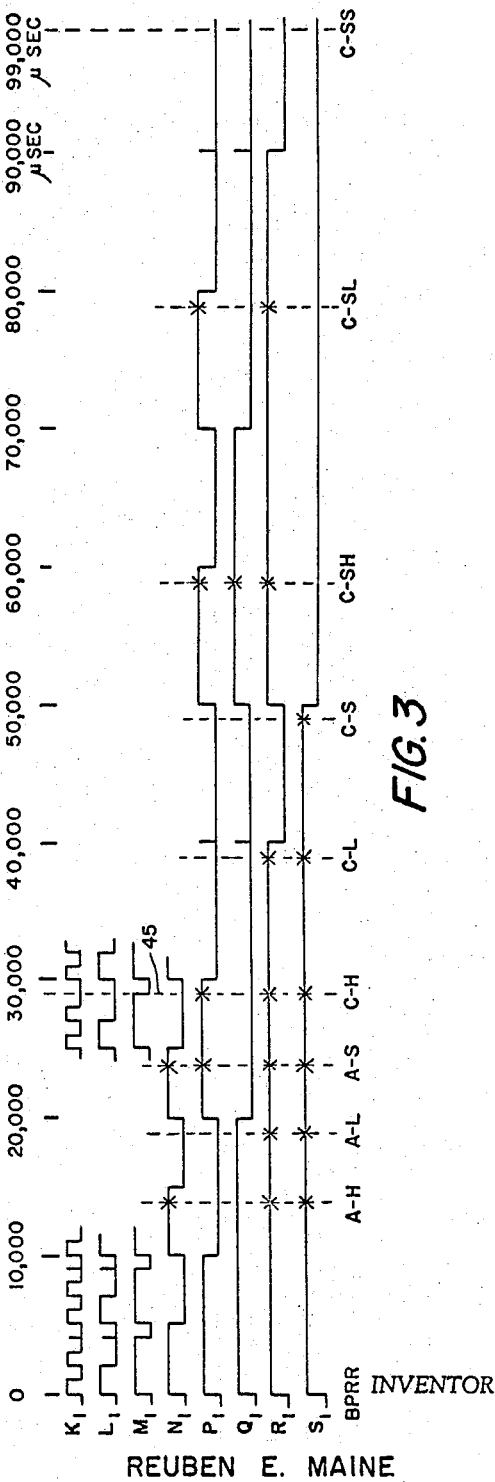

The waveforms of FIGURES 2 and 3 are referenced to the block diagram of FIGURE 1 by cross notation and will be discussed concurrently. For example, the counter chain comprising four sets of cascade connected binary-coded-decimal counters 31–34, is divided into binary counter stages B, C, D through S referring to corresponding waveforms in FIGURES 2 and 3. Also reference is made to the various loran standard periods such as A–H or C–SS referring respectively to the hereinbefore described Loran A with a basic repetition rate H and Loran C with a basic repetition rate SS. Likewise, C–3 refers to the specific repetition rate 3 as used in Loran C.

For purpose of understanding the operation of the system afforded by this invention, refer to the basic time 0 (zero) at the right of FIGURE 2, from which the specific pulse repetition rates are referenced in terms of minus 100 microsecond increments. This zero (0) time corresponds with that at the left of FIGURE 3 representing the basic pulse repetition rates where the dashed lines indicate the points at which counters referenced by asterisks are changed in state by reset pulses to establish the corresponding basic pulse repetition rates. Note that these occur at the BPRR minus 1000 microseconds so that the display of FIGURE 2 can be interposed at the left of FIGURE 3 to show the complete actual pulse repetition rate derived from combination of SPRR and BPRR operations in respective blocks 35 and 36 of FIGURE 1.

In essence therefore, the SPRR circuit 35 serves as a pulse shaping and transfer circuit to selectively preset counter stages E through J by means of control switch 37 at a time established by operation of a reset pulse entered at terminal R. This control switch has seven positions 1–7 corresponding to the SPRR notation which are different for Loran C and Loran A. However, some preset positions are identical so that a switch selecting the preset conditions of the proper number of counters E through J for eleven different positions 950, 900, 850, etc., will suffice. Thus, for A–2 and C–1 commonly referenced at line 40, for example, only counter F need be preset. This can be referenced in term of preset times in the following chart:

| SPRR | Loran A | Loran C |
|---|---|---|
| 0 | 1,000 | 1,000 |
| 1 | 950 | 900 |
| 2 | 900 | 800 |
| 3 | 850 | 700 |
| 4 | 800 | 600 |
| 5 | 750 | 500 |
| 6 | 700 | 400 |
| 7 | 650 | 300 |

This difference in presetting occurs since in Loran A, each operating cycle is divided into two equal periods of time with a master control pulse and a slave control pulse. The delay is always measured from the second half of the cycle and thus the counter will count through twice, each time subtracting half the required SPRR.

As noted at C–5 line 41, the reset occurs twenty microseconds away from the SPRR, that is at 480 microseconds rather than 500. The reasons for this will be explained hereinafter in connection with the derivation of the reset pulses 42 at lead R, which are used to reset and preset the counter stages. The reset operation of the counter stages N–S is accomplished in BPRR circuit 36 from processing reset pulses as shown by the designation R at lead 43, which permits the selected stages of counters 33 and 34 to be restored to start position at the upswing (noted by the arrow) on reset waveform 42. In general, all waveform transitions are generated in this typical embodiment by a positive pulse.

Thus, the switching circuit 44 serves to establish the BPRR timing as designated for the nine referenced switch positions at dashed lines 45, etc., in FIGURE 3. Assuming the mode of operation for C–H, with SPRR C–2, the counters would be preset to give a nominal "minus" count of 800 microseconds from line 46 and would be reset at line 45 for a pulse repetition frequency of 29,800 microseconds. Similarly, any other combination of SPRR and BPRR designated can be selected with switches 37 and 44 to provide the master timing waveform 46 at the output leads 47 of the BPRR circuit 36. Basically, this is derived from stages N–S which are passed through switch 44 into coincidence circuit 48.

To provide accuracy in the system the master timing waveform 46 is gated against the output of counter stage C provided at lead 49, resulting in the reset waveform 42 with a trailing edge occurring roughly twenty microseconds after the timing period, but precisely timed with the master oscillator frequency since delays and waveform distortion encountered in counter stage B are very slight as compared with various delays and changes of timing or accuracy provided in the cascaded stages of the central counter as reflected in waveform 46. This twenty microsecond difference in timing is that referred to on line 41 of FIGURE 2 noting the difference in timing on the SPRR of C–5 from the nominal 500 microseconds.

It may be seen from analysis of the loran basic and specific pulse repetition rates, that with the oscillator frequency output of 100 kilocycles, it is necessary to obtain a division by five for many operations in this system embodiment. For example, the preset (SPRR) conditions A–1, A–3, A–5, and A–7 require 50 microsecond transitions derived from counter stage E; the 500 microsecond transitions at counter stage J are used for C–5 and outputs of both stages N and S are used in deriving the BPRR conditions. In order to provide these signals efficiently with minimal circuits, the counters in this invention are caused to operate in a 1–2–4–5 mode of binary-coded-decimal counting.

Figure 4:
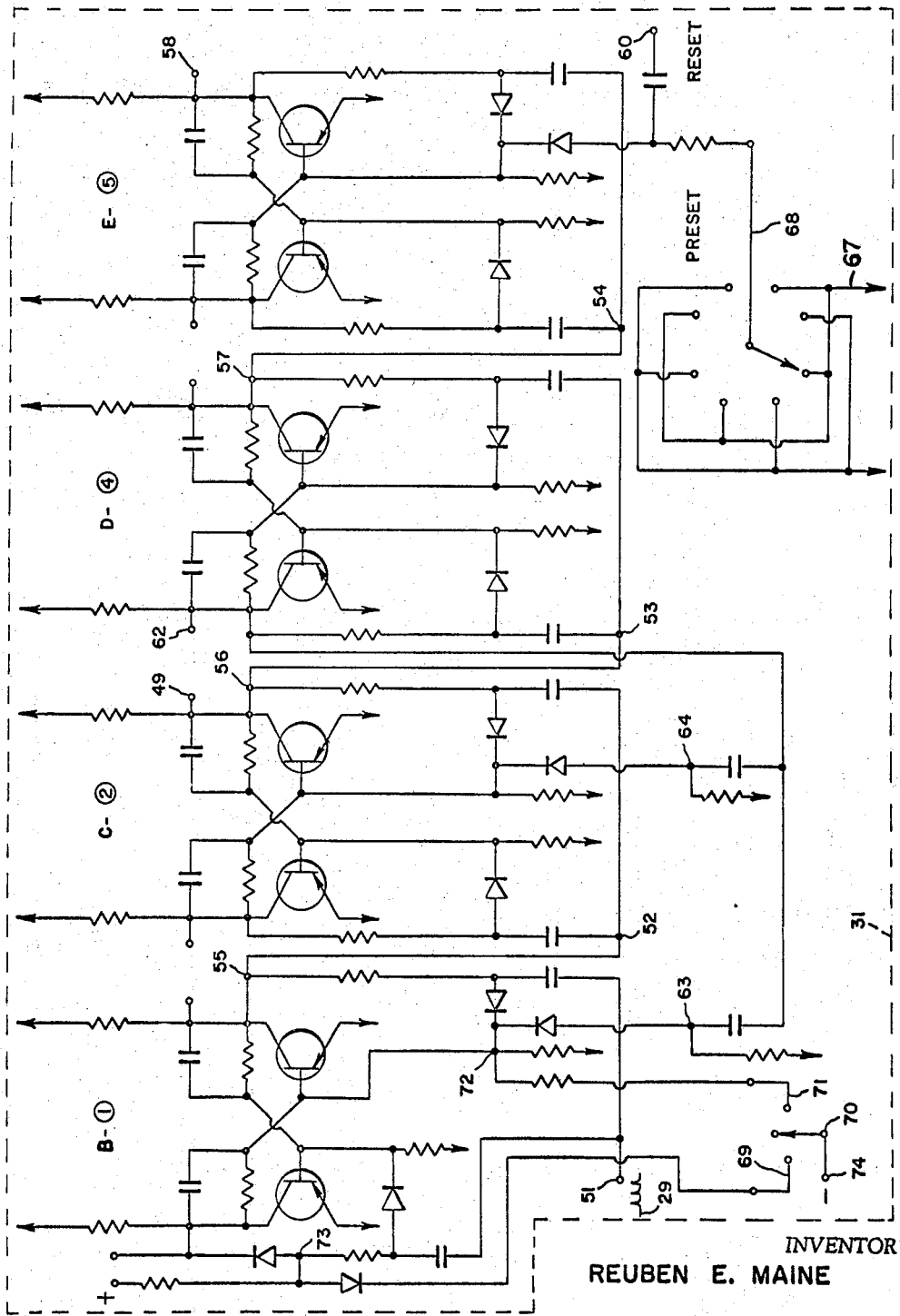
FIGURE 4 is a schematic circuit diagram of the basic counter configuration provided in accordance with one aspect of the invention.

This operation may be seen from the counter of FIGURE 4 which has four stages connected for the (1)–(2)–(4)–(5) weighting of input pulses. Only the initial counter 31 is illustrated in detail since the other counters 32–34 are similar in operation.

Each counter stage is a binary counter having a complementary input lead 51, 52, 53, 54 responsive to a positive going transition as shown from pulse train 29 derived from the master oscillator at 100 kilocycles. As shown the four stages are cascade coupled with each output lead 55, 56, 57 of a preceding stage coupled to complement the next stage. The counter output lead at 58 serves to drive the next counter 32, etc.

Each counter stage is reset by a positive transition at the base of the output transitor through a circuit from terminal 60, as shown for stage E.

External outputs for gating and control can be taken from either side of the counter stage such as the lead 49 shown for stage C. In this respect the signal at terminal 62 of stage D is used for internal feedback control to the reset terminals 63, 64 of stages B and C respectively, to attain the 1–2–4–5 mode of counting. As seen in FIGURE 2, the positive transition of the fourth oscillator pulse 65 serves to quickly set and reset stages B and C from the transition of stage D, resulting in spikes 66, 67. The fifth oscillator pulse then causes all four stages to change state at time $t$.

As seen from the waveforms BCDE of FIGURE 2, which correspond to the four stages of the counter of FIGURE 4, the count of oscillator pulses may start in the manner seen at the left end of the drawing. Transition of stage B takes place for every oscillator pulse and thus counts in the "1" mode except for feedback which gives another transition at spike 66. Similarly stage C counts in the "2" mode at every-other oscillator pulse, except for the additional feedback transition at spike 67. Stages D and E respectively change state for "4" and "5" pulses, and each stage BCD is reset at five pulses for a new cycle. Thus, the counters can be said to count in a 1–2–4–5 mode of counting.

As shown in the first stage B of the counter, a drift control switch 70 is provided for causing pulses to drift to the left when in position 69 and to the right when in position 71. In operation, the drift to the right is performed by coupling at circuit junction 72 the negative potential at 74. This causes the counter stage to operate as a single shot multivibrator in a self-resetting mode. As a result, the count rate is effectively doubled as long as the switch is closed and synchronization is lost causing pulses 17, 18 on the display 14 (FIGURE 1) to drift to the right.

Conversely, if drift control switch 70 is closed upon lead 69, the negative potential at 74 is coupled to gating diodes at circuit junction 73, which blocks the entry of input pulses 29 and serves to decrease the count rate as long as the switch is closed. This results in a leftward drift of pulses on the display screen. This operation is shown in block diagram form 94 in FIGURE 1.

The central counter chain also serves to derive the precisely measured delay time for positioning the slave pedestal of blocks 21, 22. Digital time increments of tens of mircoseconds are selected by switches 80–83 which serve to code the respective output leads of counter stages B, C . . . RS into the delay coincidence network of 85, similar in operation to AND circuit 48. This produces delay transition 87, which gates the corresponding oscillator pulse 88 in AND circuit 86 to time the waveform in the same manner previously described to obtain accuracy related to the oscillator frequency which is synchronously locked onto the received pulses, without interposition of waveform distortions or delays in the counting chain 31–34.

To provide a continuous delay representing a range of 10 microseconds the variable period multivibrator 89 is provided. Since the single shot operation is triggered by the trailing edge of the oscillator waveform this occurs at 0 plus 10 microseconds. The minimum pulse width is 10 microseconds and thus the output pulse 90 has a trailing edge occurring at 0 plus 20 to 30 microseconds, which operates the slave synchronizing circuits 21 by way of lead 91. This timing relationship is shown during a period of several successive ten microsecond periods by the waveforms 92 and 93 as referenced to oscillator pulses 29. In this manner, essentially a precision five digit selection is provided to correspond to the one-microsecond accuracy maintained in loran transmissions.

A typical preset switch connection is shown at lead 68 of FIGURE 4. As referenced on waveform E of FIGURE 2, the preset occurs for A–1, A–3, A–5, and A–7, as shown by connection of the switch rotor to terminal 67, which brings in the master reset pulse from the SPRR circuit. In the alternate connections 0, 2, 4, 6, and 8, the switch is connected to a reference potential source.

In FIGURE 5, the delay output circuit 86 and master oscillator 25 may be referenced back to the system diagram of FIGURE 1 to indicate the entire system configuration and these figures are jointly discussed throughout. Thus, the indicating switches 81, 82, and 83 may be set manually to give a coarse indication of the time difference between two signals on display screen 14, whereas the switch 80 may constitute either a manual switch or a reversible stepping switch as shown by 80' in FIGURE 5, which is used to automatically track anywhere within the range afforded in counter stage 31. The same principles outlined hereinafter may be extended to automatic control of further stages 32, etc. if desired to give a completely automatic tracking system, although from a practical matter it is not inconvenient to manually set the range in the coarser adjustments of switches 81, 82, and 83.

Thus, in FIGURE 5 the two signals of master oscillator 25 and slave oscillator 100 are controlled by synchronizing means 86, 27 to operate an indicator with an accuracy primarily established by the oscillator phase. That is with the 100 kc. oscillators shown, the pulses are provided each 10 microseconds, and the tracking-indicator system will operate accurately within a specified range of ten microseconds, as hereinafter explained. The oscillator frequency is subdivided to produce a 50 kc. basic frequency of operation afforded by the frequency divider stages 101, 102.

The two oscillators 100 and 25 then cause flip-flop circuit 103 to be alternately set and reset to produce a signal of appropriate duty cycle lasting between zero and twenty microseconds. This duty cycle is integrated at circuit 104, which may be a capacitor for example, and is coupled to a conventional meter 105, which is calibrated for the appropriate range on scale 106 to essentially replace the manual selection afforded by multivibrator 89 in FIGURE 1 with an automatically produced signal.

Operation of this automatic indicator may be better understood by reference to the waveforms of FIGURE 6. Thus, the zero time signal 46 established by the basic pulse repetition rate generator 36 (FIGURE 1) is noted on waveform 107.

A further delayed output on waveform 120 occurs with delay step 87 corresponding to the signal of FIGURE 1 obtained by adjustment of counters 80–83, which by way of slave sync circuit 21 produces the related slave oscillator waveform 121 at lead 122. As indicated by arrows at pulse 123, this waveform is affected by range switches 80, etc. to be positioned within the closest ten microseconds to the actual delay.

It may be seen that the phase indication signal 130 is the output of flip-flop 103 which is turned on by master oscillator pulses 108 of FIGURE 6A and off by slave oscillator pulses 121 of FIGURE 6B to give a zero reading on meter 105 under the circumstances outlined with a five micro-second pulse extending from $t=-5$ ms. to $t=0$, under which condition the vernier delay is read as is zero. Waveforms for the limits of operation are shown in FIGURES 6C and 6D, where the waveforms have primed reference characters to indicate the different variations in timing.

In FIGURE 6C therefore, the phase indicator meter 105 will in essence have a zero duty cycle to give a reading of $t=-5$ ms., whereas, at the other extreme of waveforms 6D, the meter receives almost a full duty cycle giving a reading of $t=$ plus 5 ms. As the range exceeds either bottom or full scale on meter 105, a ten microsecond course delay change may be made by either manual or automatic adjustment of range switch 80 in the proper direction to return meter 105 to an appropriate reading between zero and plus ten which thereby continues to give the least significant digit reading as the circuit continues to track.

With this circuit configuration having an accuracy of one percent for the phase indicator circuit, which is readily attainable, the accuracy of indication will approach 0.2 microsecond. Higher frequency oscillators will result in more precision in the measurement and the frequency can be lowered to comply with the precision required. For example, the same technique could be used to indicate any of the other digits obtained in this exemplary embodiment by manually setting switches 81–82 and 83. This may be accomplished with the same indicator circuit by selection of the oscillator frequency to produce different ranges, as by means of switch 150, which can be used to select a next most significant digit through additional counter stages 151–152. In this case the indicator meter 105 would read −50 to plus 150 microseconds selecting by course delay the nearest 100 microseconds with an accuracy of about 2 microseconds.

For automatic range switching, the manual switch 80 is simply replaced by its counterpart in the form of a conventional reversible stepping switch 80′, which may be in the form of a mechanically operated switch available from sources as Automatic Electric Company or their electronic counterparts in the form of electronic counter chains. This can be counted up or down one step each time the meter travels to one or the other limit which would then indicate roughly a midscale reading after selection of a new range digit by switch 80′. This is accomplished simply by means of threshold detector circuits 160–161 which sense a zero duty cycle on either output side of flip-flop 103 to signal the respective automatic range adjustments.

From the foregoing description of the system embodiment of the invention it may be recognized that a simplified and accurate loran receiver is produced having features of novelty believed descriptive of the nature and scope of this invention as defined in the appended claims:

What is claimed is:

1. An automatic tracking loran receiver system comprising in combination, a receiver for receiving loran signal pulses from two different loran transmitters, a master oscillator having its frequency controlled responsive to said received pulses, a single counting chain for deriving subdivisions of the oscillator frequency, first selectively adjustable means for deriving from a combination of subdivisions from said counting chain a timed signal representative of the basic pulse repetition rate, further selectively adjustable means for choosing a predetermined combination of subdivisions from said counting chain to produce delayed signals representative of the timing of one of the received pulses relative to the basic pulse repetition rate, slave oscillator synchronized by the delayed signals, a flip-flop circuit turned on responsive to signals from one of said oscillators and turned off responsive to signals from the other, and a meter indicator responsive to the duty cycle of said flip-flop calibrated to signify a significant digit of the difference of time between the two signal pulses received from the different loran stations.

2. A system as defined in claim 1 wherein a frequency divider circuit is interposed between each oscillator and the flip-flop circuit, and switching means coupled to a plurality of corresponding positions on the two divider circuits provides selective choice of signals derived from the oscillator but having different frequencies for turning on and off the flip-flop thereby signifying significant digits in different ranges on said meter indicator.

3. A system as defined in claim 1 wherein at least a portion of the selectively adjustable means for producing the delayed signals comprises a stepping switch producing a more significant range digit than that displayed on said indicator, and including threshold means connected for detecting a difference in duty cycle of said flip-flop outside the range of a digit under observation and therefrom stepping the stepping switch automatically to a further selective position to permit the indicator digit to track over a range including at least the next significant digit.

4. In a loran receiver system, automatic tracking equipment comprising in combination, a master oscillator, a slave oscillator, means controlling the frequency of the two oscillators synchronously with incoming signals from two loran transmitting stations, a flip-flop circuit connected to be turned on by a signal derived from one of said oscillators and turned off by a signal derived from the other, and a range meter indicator coupled for indicating the duty cycle of said flip-flop circuit.

5. Equipment as defined in claim 4 including an automatically controllable range switch connected to control the phase of said slave oscillator, and a threshold detecing means for establishing at least one limit of said duty cycle outside a specified range and thereby controlling said range switch in a direction maintaining the flip-flop duty cycle within the specified range.

References Cited

UNITED STATES PATENTS

| | | | |
|---|---|---|---|
| 2,487,822 | 11/1949 | McLamore | 343—103 |
| 2,497,513 | 2/1950 | Paine et al. | 343—103 |
| 2,614,159 | 10/1952 | Freas | 343—103 X |
| 3,111,671 | 11/1963 | Thompson | 343—105 X |

RODNEY D. BENNETT, *Primary Examiner.*

H. C. WAMSLEY, *Assistant Examiner.*